May 31, 1955   A. H. LIPPE   2,709,609

PACKING RING

Filed Oct. 4, 1954

Alexander H. Lippe
INVENTOR.

BY
Attorneys

United States Patent Office 2,709,609
Patented May 31, 1955

2,709,609

PACKING RING

Alexander H. Lippe, Sault Ste. Marie, Ontario, Canada, assignor of fifty per cent to Henry A. Bonnee, Sault Ste. Marie, Ontario, Canada Application October 4, 1954, Serial No. 460,167

7 Claims. (Cl. 288—3)

The present invention relates to seals and more particularly relates to a novel packing ring construction.

The primary object of this invention is in the provision of a packing ring construction which automatically compensates for wear on the packing ring and which enables replacement of the packing on the carrier ring when the wear compensation limit of the packing is reached.

In the general construction of the seal of this invention, there is provided a carrier ring concentrically surrounded by a resilient, expansible strip which is, in turn, concentrically surrounded by a ring of packing material. The carrier ring at circumferentially spaced points therearound carries a plurality of radially outwardly projecting pins having pointed ends and elongated shanks with the shanks loosely carrying the resilient, expansible strip and the pointed ends penetrating the ring of packing material, thus enabling the expansion of the strip to compensate for wear on the packing ring and permitting removal and replacement of the packing ring without disturbing the expansible strip or the carrier ring.

It is among the more important objects of this invention to provide a packing ring construction of the foregoing described character wherein the pins also constitute stops for limiting the amount of outward expansion of the resilient, expansible strip whereby this strip is permanently retained on the carrier ring of the construction while being permitted to circumferentially expand and contract.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a front elevational view of the packing ring construction of the present invention as applied to a shaft journaled through a stuffing box or bearing housing or the like;

Figure 1:
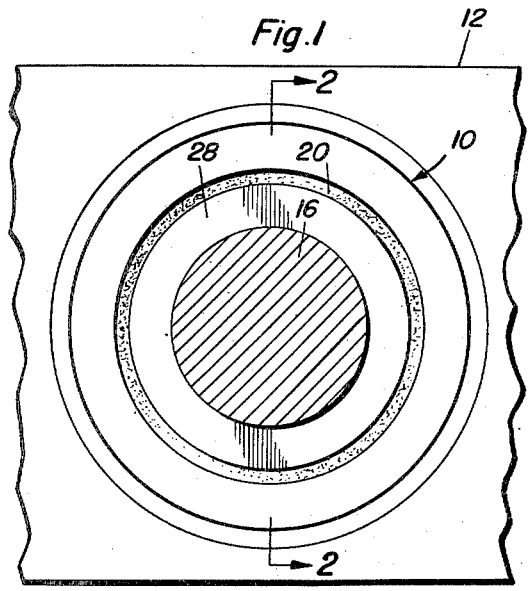

Referring to the drawings in detail, there is shown in Figure 1 a packing ring construction 10 constituting the present invention shown in a suitable environment consisting of a stuffing box, or bearing housing or the like 12, having a bore 14 therethrough through which an axle or other shaft 16 is loosely journaled.

The seal, or packing ring construction 10 constituting the invention concentrically surrounds the shaft and forms a seal between the shaft 16 and the wall of the bore 14 of the structure 12. It is to be noted that this showing is merely environmental to set forth the utility of the seal 10 and is in no way meant to preclude other uses to which the seal may be put.

Figure 2:
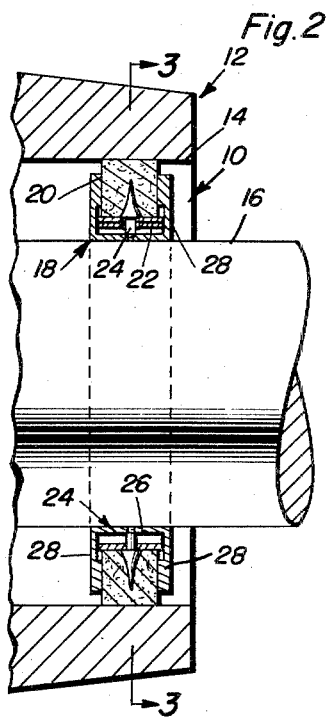
Figure 2 is a cross-sectional view in side elevation taken substantially along the plane of section line 2—2 of Figure 1.
Figure 3:
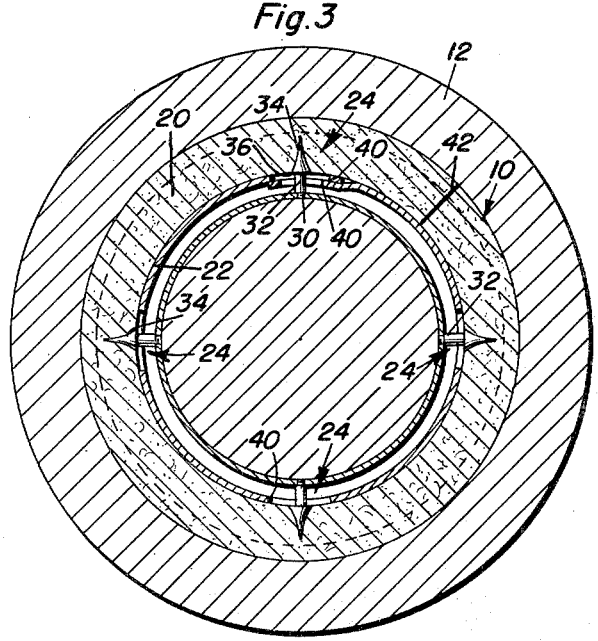
Figure 3 is a cross-sectional view taken substantially along the plane of section line 3—3 of Figure 2.

Noting Figures 2 and 3, the construction of the seal 10 will be most clearly observed wherein the same comprises a carrier ring 18, packing ring 20, resilient expansible strip 22 and fastening means in the form of pins 24.

The carrier ring is in the form of an annular channel comprising a web 26 and side flanges 28.

At circumferentially spaced points around the web 26 of the carrier ring 18, the heads 30 of the pins 24 are suitably riveted or otherwise attached. The pins 24 project radially outwardly from the web 26 and in addition to their head portions 30 comprise shanks 32 and pointed ends 34. The pointed ends 34 are in the shape of barbs or arrowheads to provide a shoulder 36 at their juncture with the shank 32.

The resilient, expansible strip 22 is in the form of an elongated flat strip of spring steel or the like having longitudinally spaced, longitudinally extending slots 40 therein. The ends of the strip 22 overlap, as will be noted in Figure 3, one of these ends being somewhat laterally offset from the other so that when so overlapped, the strip 22 is bent into the form of a ring.

The overlapped ends of the strip are provided with registering slots 40, and the shanks 32 of the pins 24 pass through the registering slots 40 at the end of the strip as well as the other slots 40 in the strip. Consequently, the strip 22 is permitted to circumferentially expand and contract on the shanks 32 of the pins 24 between the side flanges 28 of the carrier ring 18. The shoulders 36 joining the pointed ends 34 of the pins to the shanks 32 thereof serve as a means for limiting the outward expansion of the expansion strip 22.

The packing ring 20 is made of any suitable packing material such as asbestos or the like, the packing being formed first as an elongated, rectangular piece of material which is fitted between the side flanges 28 of the carrier ring and impaled upon the pointed ends 34 of the pins 24 to form a concentric ring of packing material surrounding the expansion strip 22. The ends of the packing ring may be joined in any suitable conventional manner, such as the butt joint 42 shown, or by a lap joint or any other suitable joint.

With this construction, the packing ring 20 is, of course, first drawn as tight as possible around the expansion strip 22 so that the expansion strip will lie close to or in abutment with the inside surface of the web 26 of the carrier ring 18. Thence, as the packing ring wears, the expansion strip 22 may expand to project further portions of the packing ring 20 exteriorly of the side flanges 28 to automatically compensate for wear on the packing ring.

When the limit of expansion is reached, that point wherein the expansion strip abuts the shoulders 36 of the fasteners 24, to replace the packing ring requires only the removal of the ring 20 and the replacement with a new ring without disturbing the connection of the carrier ring 18, pins 24 and expansion strip 22 to one another. This has the remarkable advantage in a seal of this structure wherein the sealing mat, namely the packing ring 20, may be replaced without replacing the complete seal.

Figure 4:
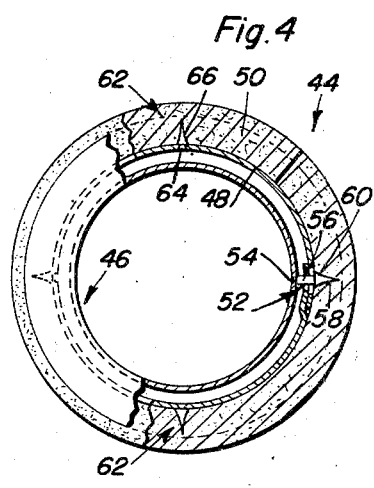
Figure 4 is a front elevational view with certain parts being shown in cross-section for clarity of detail of a slightly modified packing ring construction.

In the construction shown in Figure 4, a modified seal or packing ring construction is designated in its entirety by the numeral 44 and comprises an annular channel-shaped carrier ring 46 between the side flanges of which is received a resilient, expansible strip 48 which strip is, in turn, concentrically surrounded by a ring of packing material 50. The strip 48 is overlapped at its ends, and a fastener 52 in the form of a pin having a head 54, shank 56 and pointed end 58 is carried by the web of the carrier ring 46. The head 54 of the pin is riveted or otherwise suitably secured to the web of the channel with the shank 56 and the pointed end 58 projecting radially outwardly therefrom. The pointed end 58 is in the form of a barb or an arrowhead joining the shank with the shoulder 60. The overlapped ends of the strip 48 are loosely received on the shank 56 whereby the strip may expand and contract, the shoulder 60 limiting the expansion of the strip and the web of the channel 46 of course limiting the contraction of the strip.

Further, at circumferentially spaced points around the expansion strip 48, there are provided further fasteners 62 which are riveted or otherwise secured at their heads 64 directly to the expansion strip 48, the head being joined immediately with the pointed end 66 of each of these fasteners, which pointed end directly penetrates the sealing packing 50. Thus, in this construction, only a single fastener 52 is attached to the carrier ring 46 and only one pair of slots is necessary in the expansion strip 48, these slots being at the overlapped ends of the strip wherein they loosely receive the shank 56 of the fastener 52. The remaining fasteners to fasten the packing ring 50 to the structure are carried directly by the expansion strip 48. The packing ring 50 is obviously removable and replaceable in the same manner as the packing ring 20 noted in the first described form of the invention.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and changes may be resorted to, falling within the scope of the appended claims.

What is claimed as new is as follows:

1. A packing ring construction comprising a casing, a packing ring carried by said casing, an expansion strip interposed between said ring and casing urging said ring away from said casing, and means interconnecting said ring, strip and casing, said interconnecting means comprising pins carried by said casing, and penetrating said packing ring, said strip having longitudinal slots therein for the passage of said pins loosely therethrough.

2. A packing ring construction comprising a casing, a packing ring carried by said casing, an expansion strip interposed between said ring and casing urging said ring outwardly from said casing, and means interconnecting said ring, strip and casing, said interconnecting means comprising pins carried by said casing, and penetrating said packing ring, said strip having longitudinal slots therein for the passage of said pins loosely therethrough, said pins having shouldered heads thereon penetrating said packing ring, the shoulders of said heads limiting outward expansion of said strip.

3. An automatic wear compensating and replaceable packing construction comprising a carrier ring, a plurality of radially outwardly projecting pins carried by said carrier ring, a strip of resilient material carried by said pins concentrically surrounding said carrier ring, a packing ring carried by said pins concentrically surrounding said strip, said strip urging said packing ring outwardly from said carrier ring.

4. An automatic wear compensating and replaceable packing construction comprising a carrier ring, a plurality of radially outwardly projecting pins carried by said carrier ring, a strip of resilient material carried by said pins concentrically surrounding said carrier ring, a packing ring carried by said pins concentrically surrounding said strip, said strip urging said packing ring outwardly from said carrier ring, said pins including shanks between the carrier ring and the packing ring, said strip being loosely mounted on said shanks for limited rotational movement relative to said carrier ring.

5. An automatic wear compensating and replaceable packing construction comprising a carrier ring, a plurality of radially outwardly projecting pins carried by said carrier ring, a strip of resilient material carried by said pins concentrically surrounding said carrier ring, a packing ring carried by said pins concentrically surrounding said strip, said strip urging said packing ring outwardly from said carrier ring, said pins including shanks between the carrier ring and the packing ring, said strip being loosely mounted on said shanks for limited rotational movement relative to said carrier ring, said pins having pointed ends thereon providing shouldered junctures with said shanks for engaging said strip to limit outward movement thereof from said carrier ring.

6. An automatic wear compensating and replaceable packing construction comprising a carrier ring, a plurality of radially outwardly projecting pins carried by said carrier ring, a strip of resilient material carried by said pins concentrically surrounding said carrier ring, a packing ring carried by said pins concentrically surrounding said strip, said strip urging said packing ring outwardly from said carrier ring, said pins including shanks between the carrier ring and the packing ring, said strip being loosely mounted on said shanks for limited rotational movement relative to said carrier ring, said pins having pointed ends thereon providing shouldered junctures with said shanks for engaging said strip to limit outward movement thereof from said carrier ring, said carrier ring being channel-shaped in cross-section and including a web and side flanges, said packing ring seating between said flanges in spaced relation to said web, said strip being disposed between said web and said packing ring.

7. An automatic wear compensating and replaceable packing construction comprising a carrier ring, a plurality of radially outwardly projecting pins carried by said carrier ring, a strip of resilient material carried by said pins concentrically surrounding said carrier ring, a packing ring carried by said pins concentrically surrounding said strip, said strip urging said packing ring outwardly from said carrier ring, said strip having overlapping ends and registering longitudinal slots at said ends through which one of said pins loosely passes for allowing expansion of said strip.

References Cited in the file of this patent

UNITED STATES PATENTS

| 832,816 | Sellers | Oct. 9, 1906 |
| 1,516,197 | Lynch et al. | Nov. 18, 1924 |
| 1,893,814 | Widin | Jan. 10, 1933 |
| 1,938,249 | Fretter | Dec. 5, 1933 |
| 2,350,697 | Petch | June 6, 1944 |
| 2,433,839 | Ferguson et al. | Jan. 6, 1948 |